US012754969B2

(12) United States Patent
Kim

(10) Patent No.: US 12,754,969 B2
(45) Date of Patent: Oct. 6, 2026

(54) METHOD AND APPARATUS FOR EFFICIENT MULTIDIMENSIONAL FAST FOURIER TRANSFORMS

(71) Applicant: Seung Pil Kim, San Jose, CA (US)

(72) Inventor: Seung Pil Kim, San Jose, CA (US)

( * ) Notice: Subject to any disclaimer, the term of this patent is extended or adjusted under 35 U.S.C. 154(b) by 943 days.

(21) Appl. No.: 17/456,923

(22) Filed: Nov. 30, 2021

(65) Prior Publication Data

US 2023/0169143 A1 Jun. 1, 2023

(51) Int. Cl.
*G06F 17/14* (2006.01)

(52) U.S. Cl.
CPC .................................. *G06F 17/142* (2013.01)

(58) Field of Classification Search
CPC ................................. G06F 17/14; G06F 17/16
USPC ......................... 708/403, 404, 406, 408, 409
See application file for complete search history.

(56) References Cited

U.S. PATENT DOCUMENTS

| | | | | |
|---|---|---|---|---|
| 4,821,224 | A * | 4/1989 | Liu | G06F 17/142 708/409 |
| 5,528,736 | A * | 6/1996 | Kim | G06F 17/147 345/644 |
| 6,230,177 | B1 * | 5/2001 | Gossett | G06F 17/142 708/290 |
| 6,658,441 | B1 * | 12/2003 | Kim | G06F 17/142 708/404 |
| 6,751,643 | B2 * | 6/2004 | Jaber | G06F 17/142 708/409 |
| 8,126,953 | B2 * | 2/2012 | Shih | G06F 17/142 708/404 |
| 9,170,985 | B1 * | 10/2015 | Langhammer | G06F 17/142 |
| 9,311,274 | B2 * | 4/2016 | Chowdhury | G06F 17/142 |
| 10,984,072 | B1 * | 4/2021 | Mattingly | G06F 17/142 |
| 2006/0224651 | A1 * | 10/2006 | Madhavapeddi | G06F 17/142 708/404 |
| 2012/0041996 | A1 * | 2/2012 | Ayinala | G06F 17/142 708/404 |
| 2012/0166508 | A1 * | 6/2012 | Kim | G06F 17/142 708/404 |
| 2016/0092399 | A1 * | 3/2016 | Chen | G06F 17/142 708/409 |
| 2017/0168989 | A1 * | 6/2017 | Goswami | G06F 17/142 |
| 2017/0195281 | A1 * | 7/2017 | Guo | H04L 27/2636 |
| 2020/0319296 | A1 * | 10/2020 | Gupta | G01S 7/352 |
| 2022/0043883 | A1 * | 2/2022 | Biegaj | G06F 17/142 |
| 2022/0128652 | A1 * | 4/2022 | Gupta | G06F 17/142 |
| 2023/0062352 | A1 * | 3/2023 | Masson | H04N 19/147 |

* cited by examiner

*Primary Examiner* — James Trujillo
*Assistant Examiner* — Markus Anthony Villanueva

(57) ABSTRACT

A method and apparatus for calculating multidimensional Fast Fourier Transforms (FFTs) efficiently without transpose data flow and with in-place computations. If higher throughput computations are desired, computations are done in pipelined stages with parallel computing devices. A wide range of trade-offs can be made between the computation speed and the hardware complexity. This is based on an extension of the Cooley-Tuckey algorithm to n-dimensional data. A mathematical derivation of the algorithm has been provided. This invention makes it possible to perform n-dimensional FFTs, n>1 without relying on one-dimensional FFT computations.

6 Claims, 6 Drawing Sheets

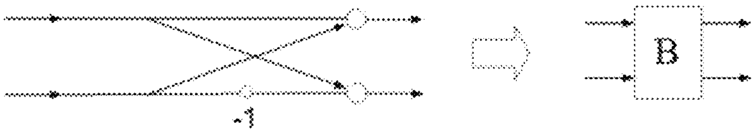
FIG. 1-a
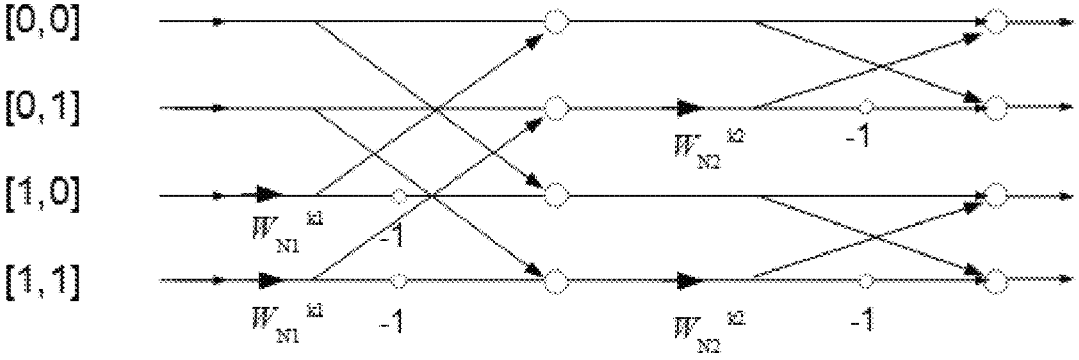
FIG. 1-b
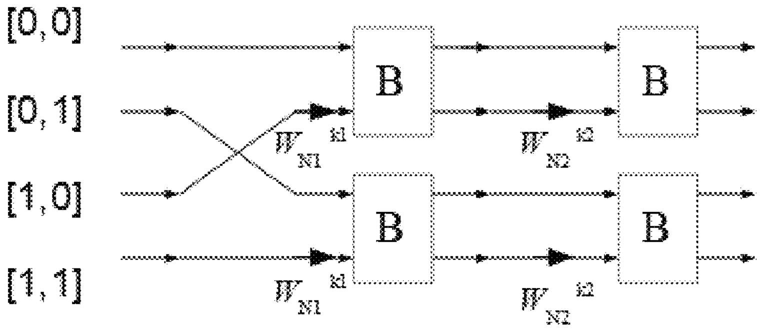
FIG. 1-c
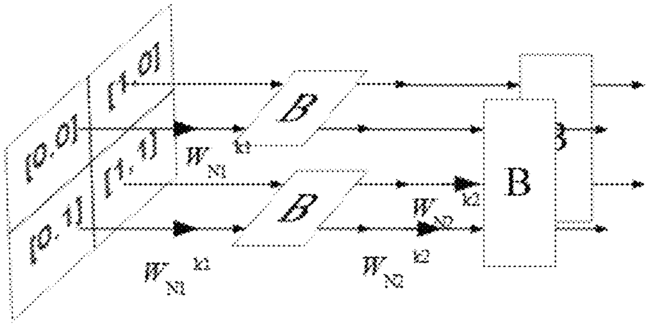
FIG. 1-d

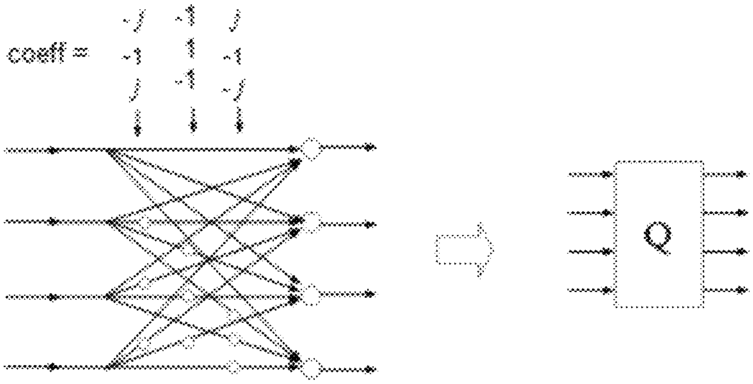
FIG. 2-a
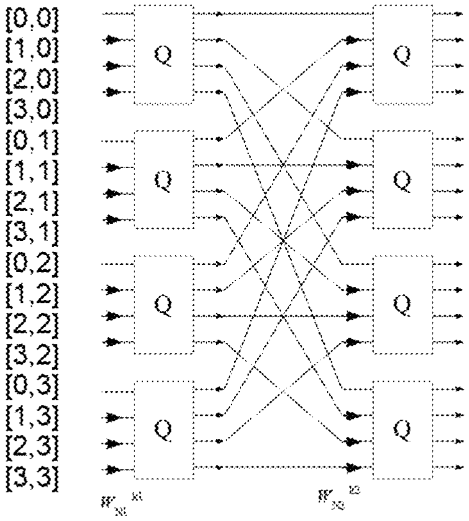
FIG. 2-b
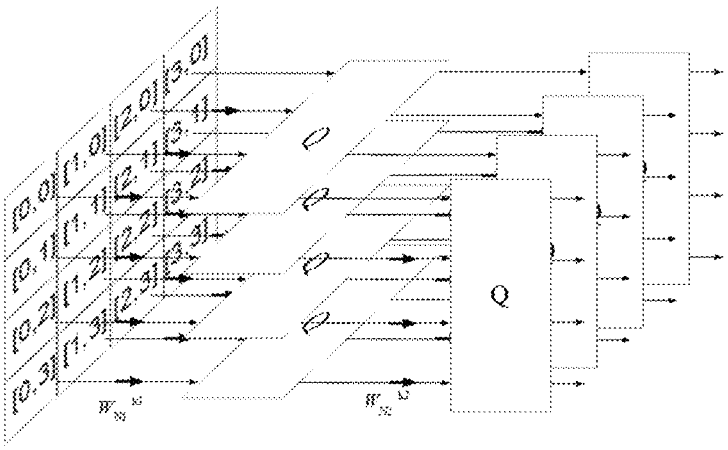
FIG. 2-c

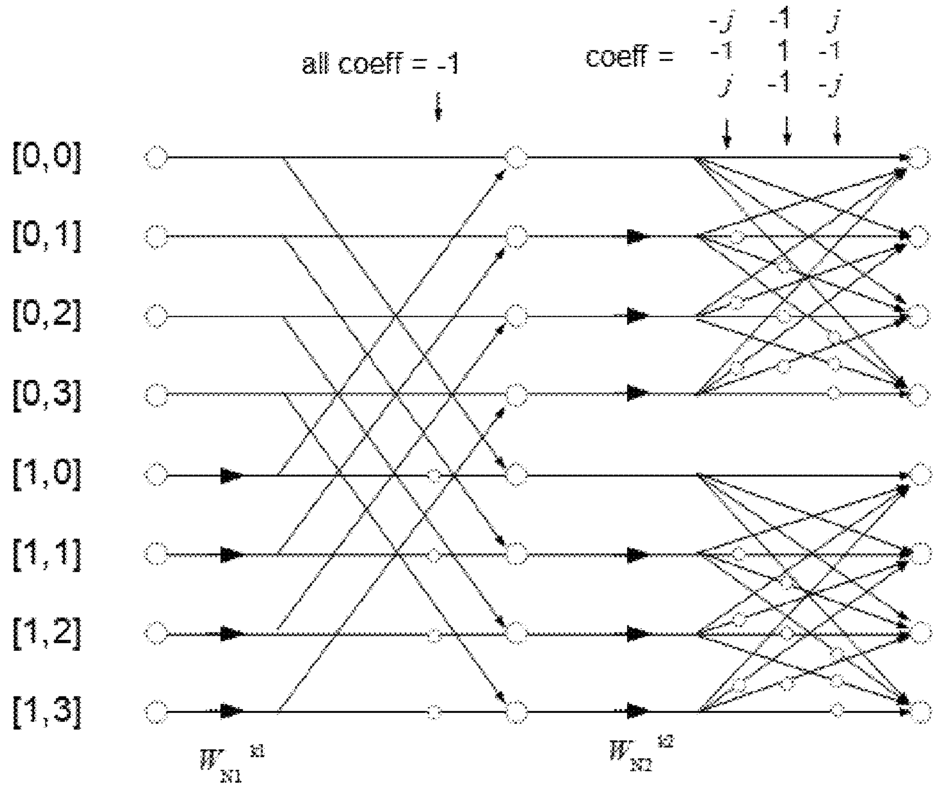
FIG. 3-a
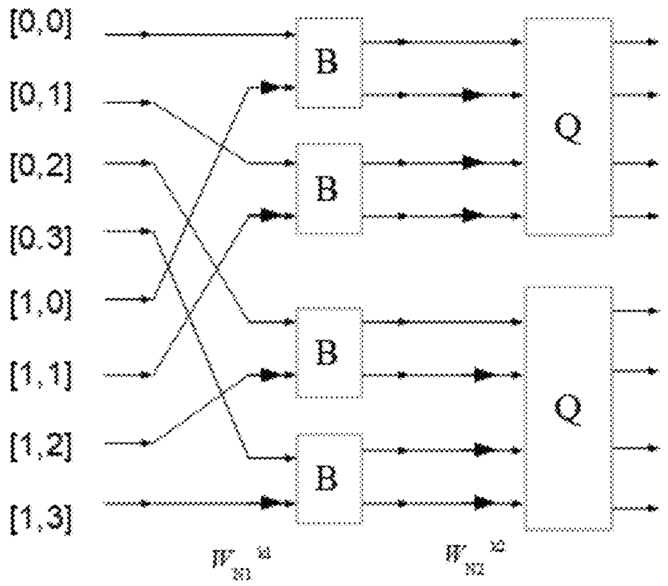
FIG. 3-b

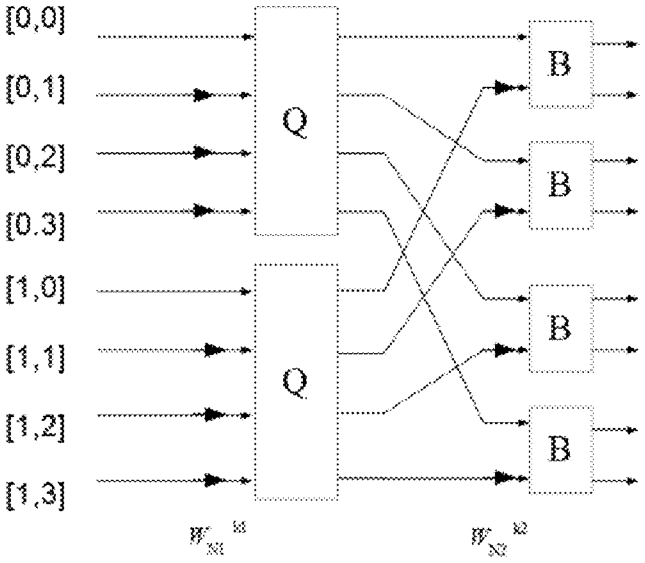
FIG. 3-c

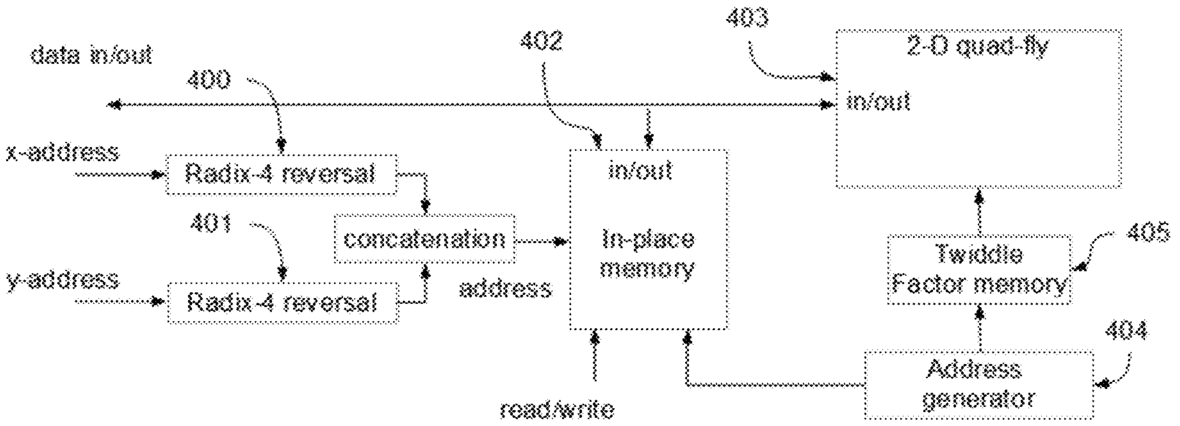
FIG. 4-a
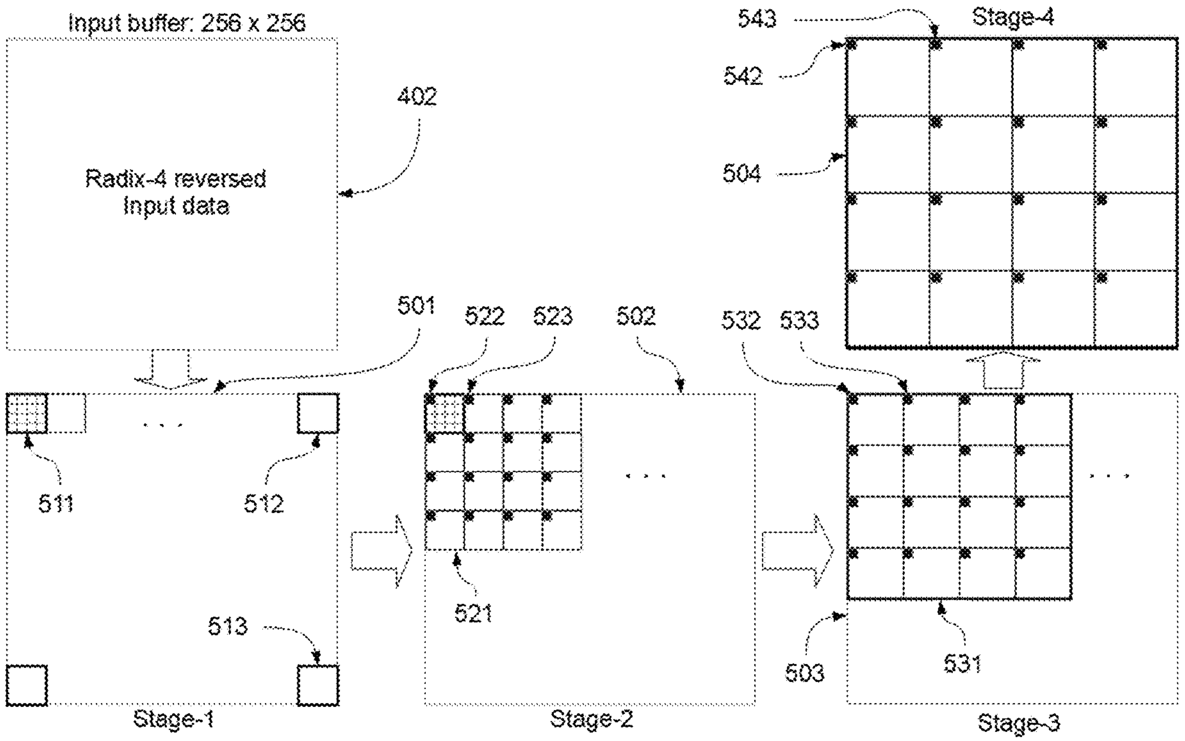
FIG. 4-b

METHOD AND APPARATUS FOR EFFICIENT MULTIDIMENSIONAL FAST FOURIER TRANSFORMS

BACKGROUND OF THE INVENTION

1. Field of Invention

This invention relates to processing of numerical data. More specifically, this invention relates to the algorithm of computing Fourier transform for data in a multidimensional space.

2. Description of the Related Art

The Fourier transform computations for one and higher dimensional data are well known. In practical applications, the computation of the Fourier transform is mostly dependent on the fast algorithm known as Fast Fourier Transform (FFT). So far only one-dimensional FFT algorithm has been used even for n-dimensional (n-D) Fourier transform computations since n-D Fourier transform is separable, i.e., n-D Fourier transform computation can be done by a sequence of one-dimensional FFTs on each dimension. This prior art for computing an n-D FFT incurs a bottleneck in data flow and creates overhead when computing the transform for a large data set due to transpose operations required between successive 1-D FFT computations. The overhead increases exponentially as n increases as well as data size increases. Much research has been done to reduce the overhead.

SUMMARY OF THE INVENTION

This invention discloses a novel method and apparatus for performing n-D FFT computations. Said method is based on an extension of the well-known Cooley-Tukey 1-D FFT algorithm to n-D FFT making it possible to compute an n-dimensional FFT directly from the input data without requiring a sequence of 1-D FFT computations. In prior art, n-D FFTs are computed by performing a sequence of 1-D FFTs on the data axes, a technique known as row-column method. By avoiding the use of 1-D FFT computations, the current invention removes the transpose operations which causes computation bottleneck in n-D FFTs, n>1. Furthermore, the present invention makes it possible to perform computations with greater parallelism for higher throughput as well as with in-place computations requiring smaller amount of memory for a given transform size for all n>1. Furthermore, the computational complexity is smaller than of the prior art. The illustrations primarily depict 2-D FFT cases for clarity and simplicity in graphical representation; however, this should not be construed as limiting, as the technique generalizes to n-dimensional FFTs as described later.

In a first aspect of the invention for a 2-D FFT embodiment, 2-D butterfly structures are shown in FIG. 1. The diagrams in FIG. 1-*b, c, d* represent all the equivalent 2-D butterflies where 1-D butterfly block notation in FIG. 1-*a* has been used in FIG. 1-*c* and FIG. 1-*d*.

In another aspect of the invention for a 2-D FFT embodiment, 2-D quad-fly structures are shown in FIG. 2. The diagrams in FIG. 2-*b, c, d* represent all the equivalent 2-D quad-flies where 1-D quad-fly block notation in FIG. 2-*a* has been used in FIG. 2-*c* and FIG. 2-*d*.

In a further aspect of the invention for a 2-D FFT embodiment, 2-D hybrid-fly structures are shown in FIG. 3. The diagrams in FIG. 3-*a* and FIG. 3-*b* are equivalent 2-D hybrid-flies where four of the 1-D butterflies and two of the 1-d quad-flies are used. The block notations for the 1-D butterfly and the 1-D quad-fly, defined in FIG. 1-*a* and FIG. 2-*a* respectively, are used in FIG. 3-*b*. This 2-D hybrid-fly has a vector radix (radix-2, radix-4) in a 2-D space ($n_1$, $n_2$). Another 2-D hybrid-fly is shown in FIG. 3-*c* having a vector radix (radix-4, radix-2).

In another aspect of the invention, related to a 3-D FFT embodiment, a 3-D butterfly structure employing a vector radix (radix-2, radix-2, radix-2) in a three-dimensional space ($n_1$, $n_2$, $n_3$) is illustrated in FIG. 6. This structure utilizes three stages of 1-D butterfly computations, applied sequentially along each of the data axes. Similarly, a 3-D quad-fly structure is defined by a vector radix (radix-4, radix-4, radix-4). A 3-D hybrid-fly structure uses a combination of different radices, for example, (radix-2, radix-2, radix-4). More generally, an n-D butterfly structure is defined by an n-D vector radix of (radix-2, radix-2, . . . , radix-2) in an n-D space ($n_1$, $n_2$, . . . , $n_n$). Likewise, an n-D quad-fly structure is characterized by a vector radix of (radix-4, radix-4, . . . , radix-4), while an n-D hybrid-fly structure includes a mix of different radices, such as (radix-2, radix-2, . . . , radix-4). Collectively, these n-D computation units—including butterflies, quad-flies, and hybrid-flies—are referred to herein as n-D-flies. In scenarios where only two radices are employed-such as radix-2 and radix-4-the number of possible n-D-fly configurations corresponds to the number of distinct binary representations, for example, mapping radix-2 to 0 and radix-4 to 1. It is therefore evident to those skilled in the art that, under this two-radix scheme, there exists one n-D butterfly (all radix-2), one n-D quad-fly (all radix-4), and $2^n$-2 distinct n-D hybrid-fly configurations.

In a further aspect of the invention, an exemplary 256×256 2-D FFT embodiment shown in FIG. 4-*a*, wherein the input memory 402 is used repeatedly throughout the computation stages supplying input data to the 2-D-fly 403 configured as a 2-D quad-fly. The results are stored back to the same location in 402 at the address provided by the address generator 404 demonstrating in-place computation capability of the invention.

In a further aspect of the invention for the exemplary 2-D FFT embodiment shown in FIG. 4-*a*, the input data in the memory 402 are processed by the n-D-fly computation block 407 where n=2. No dependencies exist among the 2-D quad-fly computations at each stage as demonstrated by an example shown in FIG. 4-*b*.

In a further aspect of the invention, the computation does not have transpose operations.

In a further aspect of the invention, n-D FFT is implemented in stages where the number of stages is determined by the maximum among the sizes of the respective data axes.

In a further aspect of the invention, each stage in an n-D FFT implementation has n-D butterflies or n-D quad-flies or n-D hybrid files.

BRIEF DESCRIPTIONS OF THE DRAWINGS

FIG. 1 depicts a construction of a 2-D butterfly;

FIG. 1-*a* depicts a 1-D butterfly data flow;

FIG. 1-*b* represents the 1-D butterfly in FIG. 1-*a* as a butterfly symbol.

FIG. 1-*c* represents a 2-D butterfly with a 2×2 input data.

FIG. 1-*d* represents the same 2-D butterfly as FIG. 1-*c* using the 1-D butterfly block symbol in FIG. 1-*b*.

FIG. 2 depicts a construction of a 2-D quad-fly;

FIG. 2-*a* depicts a 1-D quad-fly where small bubbles represent multiplications with coefficients shown on the top of the drawing.

FIG. 2-*b* represents the 1-D quad-fly in FIG. 2-*a* as a quad-fly symbol.

FIG. 2-*c* represents a 2-D quad-fly with a 4×4 input data.

FIG. 3 depicts a construction of 2-D hybrid-flies;

FIG. 3-*a* depicts a construction of a 2-D hybrid-fly with a vector radix (radix-2, radix-4).

FIG. 3-*b* depicts the same hybrid-fly as in FIG. 3-*a* using block symbols.

FIG. 3-*c* depicts a construction of a 2-D hybrid-fly with a vector radix (radix-4, radix-2).

FIG. 4 depicts an exemplary 2-D FFT computations;

FIG. 4-*a* depicts a block diagram of an exemplary 2-D FFT computations.

FIG. 4-*b* depicts data in the buffer as an exemplary 2-D FFT computation progresses.

DETAILED DESCRIPTION OF THE PREFERRED EMBODIMENT

Figure 5:
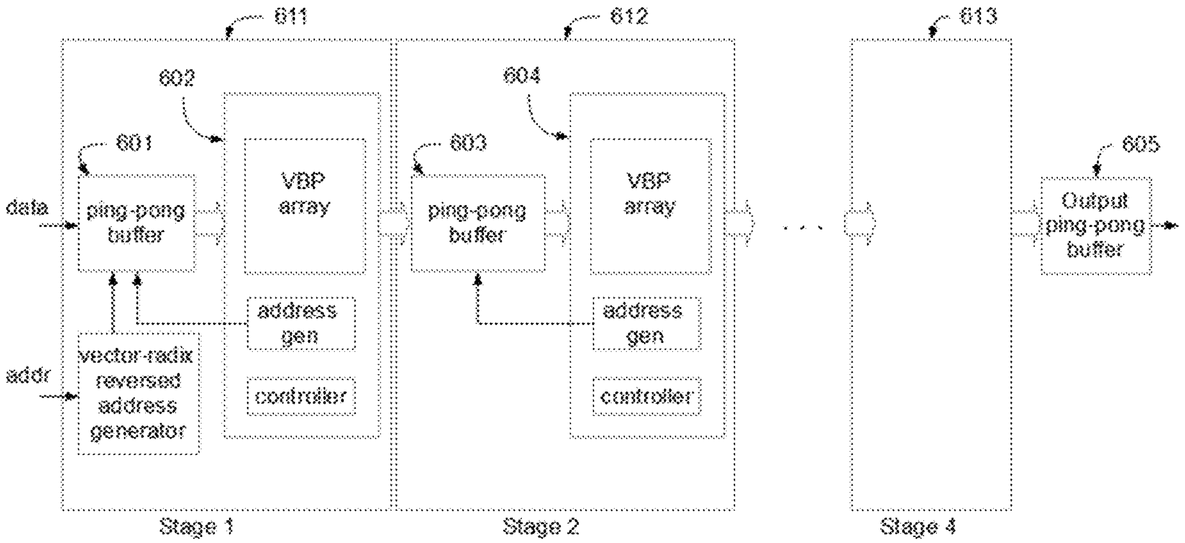
FIG. 5 depicts an exemplary pipelined and parallel n-dimensional FFT computational blocks.

The bottleneck in 2-D and higher dimensional FFT computations in the prior art stems from the transpose operations. The transpose operations are required in the prior art because 1-D FFT computations are used for 2-D and higher dimensional discrete Fourier transforms. This invention discloses a novel 2-D and higher dimensional FFT computation methods without using 1-D FFT. To this end we generalize the Cooley-Tukey algorithm in 1-D FFT to n-D FFT. We first follow the similar steps of Cooley-Tukey algorithm development in the 1-D case, i.e., even-odd decomposition, but we disclose a novel approach for extending it to n-D case utilizing signal sampling and reconstruction concept, not limited to a complexity reduction by as in the prior art. We start from a simpler 2-D case and generalize to the n-dimensional (n-D) case. In the 2-D case, even-odd decomposition of sampling indexes results in the following 4 components as;

$$x(n_1, n_2) = x^{00}(n_1, n_2) + x^{01}(n_1, n_2) + x^{10}(n_1, n_2) + x^{11}(n_1, n_2) \tag{1}$$

where $$x^{00}(n_1, n_2) = \begin{cases} x(n_1, n_2), & (n_1, n_2) = (\text{even, even}) \\ 0, & \text{otherwise} \end{cases} \tag{2}$$

$$x^{01}(n_1, n_2) = \begin{cases} x(n_1, n_2), & (n_1, n_2) = (\text{even, odd}) \\ 0, & \text{otherwise} \end{cases}$$

$$x^{10}(n_1, n_2) = \begin{cases} x(n_1, n_2), & (n_1, n_2) = (\text{odd, even}) \\ 0, & \text{otherwise} \end{cases}$$

$$x^{11}(n_1, n_2) = \begin{cases} x(n_1, n_2), & (n_1, n_2) = (\text{odd, odd}) \\ 0, & \text{otherwise} \end{cases}$$

This decomposition is different from the Cooley-Tukey's even-odd decomposition setting aside the dimensionality. Here subsampled components have the same lengths as the original signal since they maintain the original sampling interval with replaced zero sample values. The discrete Fourier transform on both sides of Eq. (1) gives, $$X_0 = X_0^{00} + X_0^{01} + X_0^{10} + X_0^{11} \tag{3}$$

where the capital letters represent the DFT of the input data;

$$X_0 \Leftrightarrow x(n_1, n_2),\ X_0^{ij} \Leftrightarrow x_0^{ij}(n_1, n_2),$$

where i, j=0,1. The subscript 0 was used to represent the original sampling domain which is the input data sampling domain. Define a new signal with a smaller signal support in the 2-D space from the subsampled signals above by completely removing the zeros outside of the signal indexes given by the even-odd decomposition. For example, a shorter signal $$x_1^{ij}(n_1, n_2) \text{ is}$$

defined from the subsampled signal in the original sampling domain as follows;

$$x_1^{ij}(n_1, n_2) = x(2n_1 + i, 2n_2 + j),\ i, j = 0, 1, \tag{4}$$
$$n_1 = 0, 1, \ldots, \frac{N_1}{2}, n_{42} = 0, 1, \ldots, \frac{N_2}{2}$$

A subscript "1" is used to denote the new decimated domain. The DFT of the subsampled components in the original sampling domain is written in terms of the DFT in the decimated domain as:

$$X_0^{ij} \equiv X_0^{ij}(k_1, k_2) = W_{N_1}^{ik_1} W_{N_2}^{jk_2} \sum_{n_2=0}^{\frac{N_2}{2}-1} \sum_{n_1=0}^{\frac{N_1}{2}-1} x_1^{ij}(n_1, n_2) W_{N_1/2}^{n_1k_1} W_{N_2/2}^{n_2k_2} = W_{N_1}^{ik_1} W_{N_2}^{jk_2} X_1^{ij}(k_1, k_2) \tag{5}$$

where $X_1^{ij} \Leftrightarrow x_1^{ij}(n_1, n_2)$.

where $$X_1^{ij} \Leftrightarrow x_1^{ij}(n_1, n_2).$$

The DFTs of $$x_1^{ij}(n_1, n_2)$$

in the decimated domain in Eq. (4) are related to the original DFT $X_0$ by $$\begin{bmatrix} X_0(k_1, k_2) \\ X_0\left(k_1 + \frac{N_1}{2}, k_2\right) \\ X_0\left(k_1, k_2 + \frac{N_2}{2}\right) \\ X_0\left(k_1 + \frac{N_1}{2}, k_2 + \frac{N_2}{2}\right) \end{bmatrix} = \begin{bmatrix} 1 & W_{N_2}^{k_2} & W_{N_1}^{k_1} & W_{N_2}^{k_2} W_{N_1}^{k_1} \\ 1 & -W_{N_2}^{k_2} & W_{N_1}^{k_1} & -W_{N_2}^{k_2} W_{N_1}^{k_1} \\ 1 & W_{N_2}^{k_2} & -W_{N_1}^{k_1} & -W_{N_2}^{k_2} W_{N_1}^{k_1} \\ 1 & -W_{N_2}^{k_2} & -W_{N_1}^{k_1} & W_{N_2}^{k_2} W_{N_1}^{k_1} \end{bmatrix} \tag{6}$$

-continued $$\begin{bmatrix} X_1^{00}(k_1, k_2) \\ X_1^{01}(k_1, k_2) \\ X_1^{10}(k_1, k_2) \\ X_1^{11}(k_1, k_2) \end{bmatrix}$$

where $k_1 = 0,1, \ldots , N_1/2$, and $k_2 = 0,1, \ldots , N_2/2$.

where $k_1=0,1, \ldots , N_1/2$, and $k_2=0,1, \ldots , N_2/2$.

The matrix in Eq. (6) is denoted as $T_4$ and it can be factored as follows.

$$T_4 = \begin{bmatrix} 1 & W_{N_2}^{k_2} & W_{N_1}^{k_1} & W_{N_2}^{k_2}W_{N_1}^{k_1} \\ 1 & -W_{N_2}^{k_2} & W_{N_1}^{k_1} & -W_{N_2}^{k_2}W_{N_1}^{k_1} \\ 1 & W_{N_2}^{k_2} & -W_{N_1}^{k_1} & -W_{N_2}^{k_2}W_{N_1}^{k_1} \\ 1 & -W_{N_2}^{k_2} & -W_{N_1}^{k_1} & W_{N_2}^{k_2}W_{N_1}^{k_1} \end{bmatrix} = \tag{7}$$

$$\left(\begin{bmatrix} 1 & 1 \\ 1 & -1 \end{bmatrix}\begin{bmatrix} 1 & 0 \\ 0 & W_{N_1}^{k_1} \end{bmatrix}\right) \otimes \left(\begin{bmatrix} 1 & 1 \\ 1 & -1 \end{bmatrix}\begin{bmatrix} 1 & 01 \\ 0 & W_{N_2}^{k_2} \end{bmatrix}\right)$$

where the symbol ⊗ represents the tensor product, defined for a 2×2 matrix X and another matrix Y as follows;

$$X \otimes Y = \begin{bmatrix} x_{11} & x_{12} \\ x_{21} & x_{22} \end{bmatrix} \otimes Y = \begin{bmatrix} x_{11}Y & x_{12}Y \\ x_{21}Y & x_{22}Y \end{bmatrix} \tag{8}$$

Eq. (7) can be written simply as $$T_4=(BW_{N_1k_1})\otimes(BW_{N_2k_2})=T_{2\times 2} \tag{9}$$

with definitions $$B = \begin{bmatrix} 1 & 1 \\ 1 & -1 \end{bmatrix}, W_{N,k} = \begin{bmatrix} 1 & 0 \\ 0 & W_N^k \end{bmatrix} \tag{10}$$

and the matrix $T_{2\times 2}$ represents $T_4$ in a factorized form. The matrix $B_N(k)=BW_{N,k}$ represents a butterfly operation in a 2-D space $(n_1, n_2)$ with a vector radix (radix-2, radix-2).

This allows for a more efficient computation of Eq. (6) in two steps as follows:

Step 1: Butterfly operations in $k_1$ direction:

$$\begin{bmatrix} a \\ b \end{bmatrix} = B_{N_1}(k_1)\begin{bmatrix} X_1^{00}(k_1, k_2) \\ X_1^{10}(k_1, k_2) \end{bmatrix} \tag{11}$$

and $$\begin{bmatrix} c \\ d \end{bmatrix} = B_{N_1}(k_1)\begin{bmatrix} X_1^{01}(k_1, k_2) \\ X_1^{11}(k_1, k_2) \end{bmatrix} \tag{12}$$

Step 2: Butterfly operations in $k_2$ direction:

$$\begin{bmatrix} X_0(k_1, k_2) \\ X_0(k_1, k_2 + N_2/2) \end{bmatrix} = B_{N_2}(k_2)\begin{bmatrix} a \\ c \end{bmatrix} \tag{13}$$

and $$\begin{bmatrix} X_0(k_1 + N_1/2, k_2) \\ X_0(k_1 N_1/2, k_2 + N_2/2) \end{bmatrix} = B_{N_2}(k_2)\begin{bmatrix} b \\ d \end{bmatrix} \tag{14}$$

This decomposition allows a reduced complexity calculation, and its data flow is depicted in FIG. 1-*c* and FIG. 1-*d*. It is possible to change the order of butterfly operations, if necessary, with proper rearrangement of input vector elements. The $T_{2\times 2}$ matrix represents a 2-D basic computation block.

Radix-4 decomposition: A similar development is made by using the decimation-by-four for a 2-D signal, $x(n_1, n_2)$, $n_1=0,1, \ldots , N_1-1$, $n_2=0,1, \ldots , N_2-1$, wherein we assume the size in each dimension is power of 4, i.e., $N_s=4^{Ms}$, $M_i$ positive integers, with s=0,1.

$$x(n_1, n_2) = \sum\nolimits_{i,j=0,1,2,3} x_0^{i,j}(n_1, n_2) \tag{15}$$

The sub-sampled components are given by;

$$x_0^{i,j}(n_1, n_2) = \begin{cases} x(n_1, n_2), & n_1 = 4n_1' + i,\ n_2 = 4n_2' + j,\ n_1' = 0,1, \ldots , \frac{N_1}{4} - 1,\ n_2' = 0,1, \ldots , \frac{N_2}{4} - 1 \\ 0, & \text{otherwise} \end{cases} \tag{16}$$

Performing DFT on both sides of Eq. (15) the DFT of the input signal is represented as a sum of the DFTs of sub-sampled components $$x_0^{i,j}(n_1, n_2),\ i, j = 0, 1, 2, 3,$$

as follows $$X_0 = X_0^{00} + X_0^{01} + X_0^{02} + X_0^{03} + X_0^{10} + \ldots + X_0^{30} + X_0^{31} + X_0^{32} + X_0^{33} \tag{17}$$

where $X_0 \Leftrightarrow x(n_1, n_2)$, $$X_0^{i,j} \Leftrightarrow x_0^{i,j}(n_1, n_2),\ i, j = 0, 1, 2, 3.$$

Using the definition of signals in the decimated domain as, $$x_1^{ij}(n_1, n_2) = x(4n_1 + i, 4n_2 + j),\ i, j = 0,1,2,3 \quad n_1 = 0,1, \ldots , \frac{N_1}{4} - 1,\ n_2 = 0,1, \ldots , \frac{N_2}{4} - 1 \tag{18}$$

the DFT components in Eq. (17) can be written as;

$$X_0^{ij} \equiv X_0^{ij}(k_1, k_2) = W_{N_1}^{ik_1} W_{N_2}^{jk_2} \sum_{n_2=0}^{\frac{N_2}{4}-1} \sum_{n_1=0}^{\frac{N_1}{4}-1} x_1^{ij}(n_1, n_2) W_{N_1/4}^{n_1 k_1} W_{N_2/4}^{n_2 k_2} = W_{N_1}^{ik_1} W_{N_2}^{jk_2} X_1^{ij}(k_1, k_2) \tag{19}$$

where $X_1^{ij}(k_1, k_2) \Leftrightarrow x_1^{ij}(n_1, n_2)$.

where $$X_1^{ij}(k_1, k_2) \Leftrightarrow x_1^{ij}(n_1, n_2).$$

The overall relationship between the original DFT and the DFT components in the decimated domain is given by $$\begin{bmatrix} X_0(k_1, k_2) \\ X_0\left(k_1, k_2 + \frac{N_2}{4}\right) \\ X_0\left(k_1, k_2 + \frac{N_2}{2}\right) \\ \vdots \\ X_0\left(k_1 + \frac{3N_1}{4}, k_2 + \frac{3N_2}{4}\right) \end{bmatrix} = T_{16} \begin{bmatrix} X_1^{00}(k_1, k_2) \\ X_1^{01}(k_1, k_2) \\ X_1^{02}(k_1, k_2) \\ \vdots \\ X_1^{33}(k_1, k_2) \end{bmatrix} \quad (20)$$

where $$T_{16} = T_{4\times4} - \left( \begin{bmatrix} 1 & 1 & 1 & 1 \\ 1 & -j & -1 & j \\ 1 & -1 & 1 & -1 \\ 1 & j & -1 & -j \end{bmatrix} \begin{bmatrix} 1 & 0 & 0 & 0 \\ 0 & W_{N_1}^{k_1} & 0 & 0 \\ 0 & 0 & W_{N_1}^{2k_1} & 0 \\ 0 & 0 & 0 & W_{N_1}^{3k_1} \end{bmatrix} \right) \otimes \left( \begin{bmatrix} 1 & 1 & 1 & 1 \\ 1 & -j & -1 & j \\ 1 & -1 & 1 & -1 \\ 1 & j & -1 & -j \end{bmatrix} \begin{bmatrix} 1 & 0 & 0 & 0 \\ 0 & W_{N_2}^{k_2} & 0 & 0 \\ 0 & 0 & W_{N_2}^{2k_2} & 0 \\ 0 & 0 & 0 & W_{N_2}^{3k_2} \end{bmatrix} \right) \quad (21)$$

Eq. (21) can be written as $$T_{4\times4} = (QW_{N_1,k_1}) \otimes (QW_{N_2,k_2}) \quad (22)$$

with definitions $$Q = \begin{bmatrix} 1 & 1 & 1 & 1 \\ 1 & -j & -1 & j \\ 1 & -1 & 1 & -1 \\ 1 & j & -1 & -j \end{bmatrix}, \text{ and } W_{n,k} = \begin{bmatrix} 1 & 0 & 0 & 0 \\ 0 & W_N^k & 0 & 0 \\ 0 & 0 & W_N^{2k} & 0 \\ 0 & 0 & 0 & W_N^{3k} \end{bmatrix} \quad (23)$$

The matrix $Q_N(k) = QW_{N,k}$ represents a 1-D quad-fly operation for the computation of transform size N from the previous transform of size of N/4 on a given axis. The matrix $T_{4\times4}$ represents a radix-4 computation in a 2-D space $(n_1, n_2)$ with a vector radix (radix-4, radix-4).

The reduction of the DFT sizes of the components at each stage is achieved either by butterfly or quad-fly, depending on even-odd decomposition or radix-4 decomposition. The reduction process is repeated until the final 2-point or 4-point DFT size is reached on all axis for a given transform size $N=2^m$, m a positive integer.

A similar decomposition technique can be applied to a 3-dimensional data $x(n_1, n_2, n_3)$, $n_1=0,1, \ldots, N_1-1$, $n_2=0,1, \ldots, N_2-1$, $n_3=0,1, \ldots, N_3-1$. The process is identical except the fact that the dimensionality has increased, and as a result, the number of terms in the equation increased after even-odd decomposition (radix-2) or radix-4 decompositions. For example, a radix-2 decomposition of a 3-D signal would generate a 8×8 T matrix since there are 8 components after the decomposition. The T matrix is represented as;

$$T_{2\times2\times2} = (BW_{N_1k_1}) \otimes (BW_{N_2k_2}) \otimes (BW_{N_3k_3}) \quad (24)$$

Figure 6:
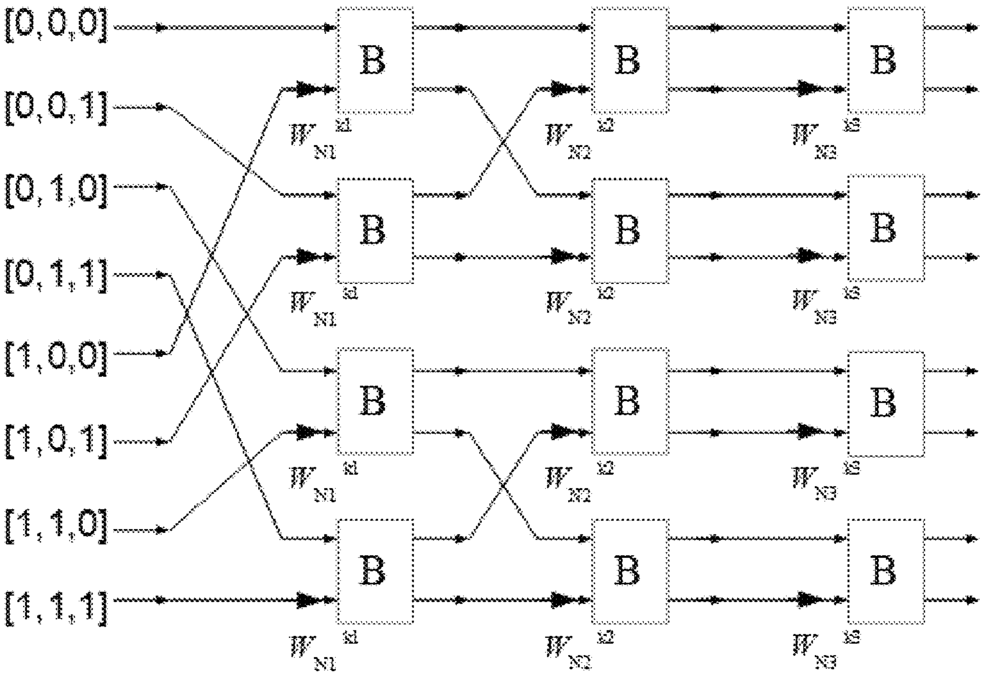
FIG. 6 depicts a 3-D butterfly.

The matrix $T_{2\times2\times2}$ represents a 3-D butterfly with a vector radix (radix-2, radix-2, radix-2) in a 3-D space $(n_1, n_2, n_3)$. FIG. 6 shows the structure for the computation of Eq. (24).

Similarly, radix-4 decomposition of a 3-D signal would generate a T matrix of size 64×64 in a factored form as;

$$T_{4\times4\times4} = (QW_{N_1K_1}) \otimes (QW_{N_2k_2}) \otimes (QW_{N_3k_3}) \quad (25)$$

The matrix $T_{4\times4\times4}$ represents a 3-D quad-fly with a vector radix (radix-4, radix-4, radix-4) in a 3-D space $(n_1, n_2, n_3)$.

In general, a radix-2 decomposition of a n-dimensional signal would give a $2^n\times2^n$ T matrix as follows in a factored form $$T_{2\times2\times\ldots\times2} = (BW_{N_1k_1}) \otimes (BW_{N_2K_2}) \otimes \ldots \otimes (BW_{N_nk_n}) \quad (26)$$

Similarly, a radix4 decomposition of a n-dimensional signal would give a $4^n\times4^n$ T matrix as follows in a factored form $$T_{4\times4\times\ldots\times4} = (QW_{N_1k_1}) \otimes (QW_{N_2k_2}) \otimes \ldots \otimes (QW_{N_nk_n}) \quad (27)$$

In an exemplary embodiment of 256×256 2-D FFT shown in FIG. 4-*a*, the input data are stored in the input buffer 402 in a radix-4 reversed manner. The radix-4 reversal is achieved by the address mapping: from address-in $=b_7b_6b_5b_4b_3b_2b_1b$, to address-out= $(b_1b_0)$ $(b_3b_2)$ $(b_5b_4)$ $(b_7b_6)$. The address mapping is applied to both row and column addresses respectively, as shown by blocks 400 and 401 in FIG. 4-*a*.

Within the block 403, the row and column direction 1-D quad-fly computations are performed in a sequential manner in two stages as shown in FIG. 2-*b* and FIG. 2-*c*. The results from the block 403 are stored back in the input buffer 402 at the same 4×4 locations. Note that no data dependency exists among the 2-D quad-fly computations. The 4×4 data block 511 at the top-left of the Stage-1 output in FIG. 4-*b* represent the input and output locations of the first 2-D quad-fly computation in the memory buffer 402 in FIG. 4-*a*. There is a total of 64×64=4096 of output blocks as indicated by 511, 512 and 513, which are the results of all independent computations. At Stage-2, 16×16 2-D DFT computations are performed. The first input block, block 521 in FIG. 4-*b* has 16×16 input data elements. The sixteen (4×4) small dark squares at the top-left corner 522, 523, etc. collectively represent a 4×4 input and 4×4 output data of the first 2-D quad-fly computation in the second stage. The distances between dark squares, for example, 522 and 523 are 4 in both $n_1$ and $n_2$ directions, and a total of 16 2-D used to process the block 521.

All of the 16 quad-fly computations in the data block 521 are done independent of each other with its own input and output data sets. The twiddle factors are computed according to the locations of the input data within the block 521, with the target DFT size N=16 according to Eq. (23). Since there are 16×16 of such blocks in this example and each block has 16 independent 2-D quad-fly computations, the total number of independent 2-D quad-fly computations remains the same at (16×16)×16=4096.

At Stage-3, 64×64 2-D DFT computations are performed. The first input data block, 531, has 64×64 data elements. The small dark squares, for example, 532 and 533 at the top-left corner of inner squares of the block 531 collectively represent a 4×4 input and 4×4 output arrays for a 2-D quad-fly computation. The distances between adjacent dark squares are 16 in both $n_1$ and $n_2$ directions and a total of 256(=16×16) 2-D quad-fly computations is necessary for the block 531. All the 256 quad-fly computations are independent of each other with its own inputs and outputs. The twiddle factors are computed according to the locations of the input data within the block 531, with the target DFT size N=64 according to Eq. (23). Since there are 16 (=4×4) of such input data blocks and each block requires 256 independent 2-D quad-fly computations, the total number of independent 2-D quad-fly computations remains the same at (4×4)×256=4096.

At Stage-4, the final 256×256 2-D FFT computation is performed on the whole input data in the memory 402. The small dark squares, for example, 542 and 543, at the top-left corner of the inner squares of the block 531 collectively represent a 4×4 input and 4×4 output arrays for a 2-D quad-fly computation. The distances between adjacent dark squares are 64 in both $n_1$-directions and $n_2$-directions. The total number of 2-D quad-fly computations is 64×64=4096. The twiddle factors are computed according to the locations of the input data within the block 504, with the target DFT size N=256 according to Eq. (23).

Another embodiment of the current invention is presented for higher throughput computations. A pipelined implementation of a 2-D FFT is disclosed in FIG. 5. Instead of utilizing the same memory as an input buffer and an output buffer for each stage of computations, a dedicated ping-pong input buffer is used at each stage, from Stage-1 to Stage-S, where the number of stages S is determined by the transform size N i.e.

$$S = \log 4\left(\max_i (N_i)\right),$$

where $N=N_1*N_2 \ldots * N_n$ and a radix-4 decompositions are used. Only the final stage, Stage-S has its own output buffer 605 since the input ping-pong buffers at Stage-i is used as an output buffer for the previous stage, Stage-(i−1), i=2, 3, . . . , S. For example, the input ping-pong buffer 603 is used as an output buffer for Stage-1. The 2-D quad-fly array block 602, for example, can be implemented using a single 2-D-fly computation block 407 in FIG. 4-*a* or a plurality of said 2-D-fly computation blocks for parallel computations. The number of 2-D-fly computation blocks for parallel computation could be determined to match the number of memory read/write ports blocks 601 and 603, etc., An example of a 3-D butterfly with a vector radix configuration (radix-2, radix-2, radix-2) is shown in FIG. 6 using 1-D butterflies depicted in FIG. 1-*a*. In a similar way, a 3-D quad-fly with a vector radix (radix-4, radix-4, radix-4) can be implemented using 1-D quad-flies in FIG. 2-*a*. In fact, it can be generalized to n-D butterflies, n-D quad-flies, and n-D hybrid-flies using the equations (26) and (27) where n=1, 2, . . . .

What is claimed is:

1. A method, comprising:

reading an n-dimensional input data of a size $N_1 \times N_2 \times \ldots \times N_n$ from an input buffer, the n-dimensional input data having a size $N_i$ along each of an axis i=1, 2, . . . , n, wherein n is an integer greater than or equal to 2;

performing an n-dimensional fast Fourier transform (FFT) using one or more n-dimensional radix butterfly computing elements referred to as n-D-fly computation blocks, and the performing further comprises:

computing an n-dimensional output of a size $r_1 \times r_2 \times \ldots \times r_n$ from an input of the same size by using one or more of a plurality of one-dimensional butterfly blocks or one or more of a plurality of one-dimensional quad-fly blocks along each of the axis i=1, 2, . . . , n, in a sequential manner, depending on whether the radix $r_i$ of the axis i is 2 or 4; and computing an intermediate n-dimensional FFTs of progressively increasing sizes in an S number of stages, wherein S is a total number of the stages, wherein:

at a first stage, Stage-1, the n-D-fly blocks compute a plurality of n-dimensional outputs of a size $$r_1^{(1)} \times r_2^{(1)} \times \ldots \times r_n^{(1)};$$

after receiving a corresponding plurality of inputs of a same size from an input ping-pong buffer, the plurality of n-dimensional outputs being equivalent to n-dimensional discrete Fourier Transforms (DFTs), wherein the first stage radix $$r_i^{(1)} = 2 \text{ or } 4$$

depending on a radix decomposition selected for the axis i=1, 2, . . . , n;

at Stage-s, where s=2, 3, . . . , S, the intermediate n-dimensional FFTs of increased size are computed using the plurality of n-dimensional outputs computed from the previous stage and received from a ping-pong buffer, and a plurality of twiddle factors computed from a plurality of locations of the n-dimensional input data at a current stage, Stage-s, wherein a transform size along the axis i is increased by a factor $$r_i^{(s)} = 2 \text{ or } 4$$

wherein an n-dimensional radix at Stage-s is $$r_1^{(s)} \times r_2^{(s)} \times \ldots \times r_n^{(s)};$$

and at a final stage, Stage-S, computing a final n-dimensional FFT of a size $N_1 \times N_2 \times \ldots \times N_n$ corresponding to the n-dimensional input data of the size $N_1 \times N_2 \times \ldots \times N_n$ and outputting to an output ping-pong buffer.

2. The method of claim 1, wherein the n-dimensional fast Fourier transform is performed in a serial manner using a single n-D-fly computation block, wherein the n-D-fly computation block comprises a processor or a programmable logic device, and the n-D-fly computation block at Stage-s is configured to compute according to the n-dimensional radix, $$r_1^{(s)} \times r_2^{(s)} \times \ldots \times r_n^{(s)}$$

and the plurality of twiddle factors corresponding to the Stage-s.

3. The method of claim 1, wherein each Stage-s is computed in parallel using a plurality of n-D-fly computation blocks, and wherein each Stage-s is configured to compute according to the n-dimensional radix, $$r_1^{(s)} \times r_2^{(s)} \times \ldots \times r_n^{(s)}$$

and the plurality of twiddle factors corresponding to the Stage-s.

4. An apparatus, comprising:

an input buffer configured to store an n-dimensional input data of a size $N_1 \times N_2 \times \ldots \times N_n$ wherein n is an integer greater than or equal to 2;

an output buffer configured to store an n-dimensional FFT result of the n-dimensional input data; and an Stage-s computation pipeline, wherein s=1, 2, . . . , S and S is a total number of the stages, having an n-dimensional radix $$r_1^{(s)} \times r_2^{(s)} \times \ldots \times r_n^{(s)}$$

at Stage-s, wherein each stage in Stage-s comprises one or more n-D-fly computation blocks implemented using a plurality of processors or a plurality of programmable logic devices, wherein each n-D-fly computation block further comprises:

a plurality of n sequential sub-stages, wherein each sub-stage is configured to compute along a corresponding data axis i=1, 2, . . . , n in a sequential manner, wherein each sub-stage comprises one or more of a plurality of one-dimensional butterfly blocks or one or more of a plurality of one-dimensional quad-fly blocks, depending on a radix $$r_i^{(s)} = 2$$

or 4 selected for the data axis i at Stage-s, wherein each stage further comprises a ping-pong buffer;

wherein each stage further comprises a storage for a plurality of twiddle factors and the plurality of twiddle factors computed from a plurality of locations of the n-dimensional input data at each Stage-s;

the Stage-s computation pipeline configured at each Stage-s to increase a transform size along each axis i by the corresponding radix factor $$r_i^{(s)},$$

producing an intermediate n-dimensional FFTs of progressively increasing sizes; and at Stage-S, computing a final n-dimensional FFT of size $N_1 \times N_2 \times \ldots \times N_n$ corresponding to the n-dimensional input data of the size $N_1 \times N_2 \times \ldots \times N_n$ and outputting to an output ping-pong buffer.

5. The apparatus of claim 4, wherein said input buffer and output buffer are implemented using a single memory block for in-place computation.

6. The apparatus of claim 4, wherein the each stage further comprises a ping-pong buffer is configured to enable a plurality of pipelined n-D-fly computations across all Stage-s.

* * * * *